Figure 1:
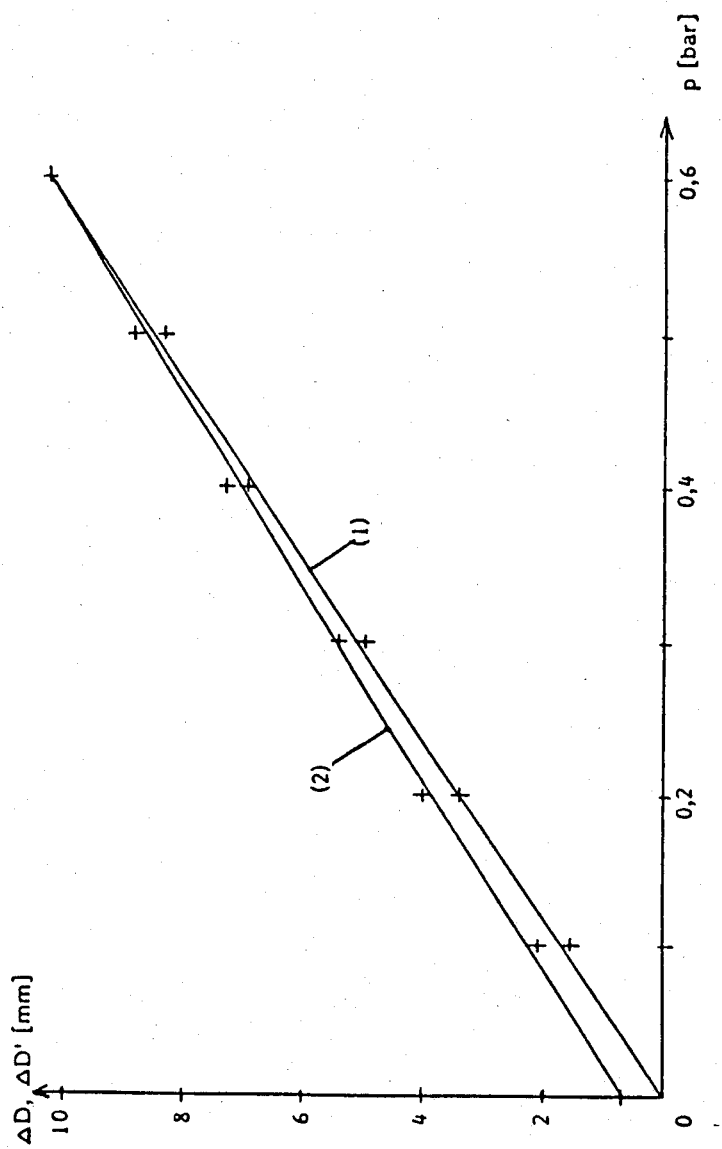

United States Patent [19]

Erk et al.

[11] Patent Number: 4,601,929
[45] Date of Patent: Jul. 22, 1986

[54] SINGLE-LAYER ELASTIC TUBULAR FILM OF POLYAMIDE USED FOR PACKAGING PASTE SUBSTANCES AND A PROCESS FOR THE PRODUCTION OF SUCH FILM

[75] Inventors: Gayyur Erk, Gorsheimertal; Rudi Korlatzki, Laudenbach, both of Fed. Rep. of Germany

[73] Assignee: Naturin-Werk Becker & Company, Fed. Rep. of Germany

[21] Appl. No.: 517,137

[22] Filed: Jul. 25, 1983

[30] Foreign Application Priority Data

Jul. 27, 1982 [DE] Fed. Rep. of Germany ....... 3227945

[51] Int. Cl.$^4$ .......................... F16L 1/00; B65D 85/00
[52] U.S. Cl. ..................................... 428/36; 138/118.1; 426/105; 426/129; 426/135
[58] Field of Search ....................... 138/118.1; 428/36; 426/105, 129, 135

[56] References Cited

U.S. PATENT DOCUMENTS 3,369,911  2/1968  von Witzleben .................. 99/176
4,243,074  1/1981  Strutzel et al. .................. 138/118.1
4,303,711  12/1981  Erk et al. ........................ 428/36

FOREIGN PATENT DOCUMENTS 1387030  5/1975  United Kingdom .
1461401  3/1977  United Kingdom .

Primary Examiner—John E. Kittle
Assistant Examiner—James J. Seidleck
Attorney, Agent, or Firm—Jones, Tullar & Cooper

[57] ABSTRACT

The present invention relates to a tubular film used for packing foodstuffs in paste form, this tubular film being of polyamide that can absorb at least 5% water, and which at an internal pressure between 0 and 0.6 bar permits substantially reversible deformation and which has a matt appearance. The present invention also relates to a process for the production of this tubular film by multiaxial stretching of the primary tube with stretch ratios of at least 1:2.3 in the longitudinal direction and at least 1:2.5 in the transverse direction, and total thermal fixing of the stretched tube during controlled shrinkage. In addition, the invention describes a boiled or cooked sausage as well as a soft cheese, these being packed in a tubular film according to the invention.

9 Claims, 3 Drawing Figures

SINGLE-LAYER ELASTIC TUBULAR FILM OF POLYAMIDE USED FOR PACKAGING PASTE SUBSTANCES AND A PROCESS FOR THE PRODUCTION OF SUCH FILM

This invention relates to a single-layer elastic tubular film of polyamide, used for packaging paste materials, particularly foodstuffs, that are packed when hot, or else are subjected to heat treatment after packing, and to a process for producing this film.

In particular, the present invention relates to a tubular film that can be used as a sausage casing for table sausages and boiled sausages, and can also be used for goods such as soft cheeses that are packaged in a semi-liquid state.

Various demands are imposed on tubular films of this kind, particularly if they are used as sausage casings for boiled and table sausages, and in part these demands are mutually exclusive. If one relinquishes the requirement of smoke permeability, it is possible to use tubular films of thermoplastic materials that meet most requirements such as low price, problem-free processing, low permeability with regard to gases, water vapour, and undesirable bacteria. However, up to now nearly all of the thermoplastic materials used as sausage casings have the disadvantage that once the sausage has been boiled and subsequently cooled they do not fit round the sausage material closely, in the manner of a natural casing, but appear to be more or less wrinkled. The customer equates such wrinkled appearance with old goods that are no longer fresh, and this is an obstacle to sale. For this reason up to now such sausage casings of thermoplastic materials have only been used by sausage makers for second-rate goods. Various proposals for solving this problem have already been made. Thus, German patent No. 21 32 259 describes a device used to produce a stretched tube of thermoplastic material that can be shrunk. In this connection, a tube preferably of polyamide 12 is drawn—and thereby stretched—over a stretching bar whilst being heated and then subjected to controlled air cooling, the anticipated transverse contraction being hindered by the bar. Sausages packaged in these casings also appear wrinkled after overnight cooling and, in order to achieve a smooth appearance they must be immersed once again for a few seconds in boiling water. This causes the casing to shrink and lie almost wrinkle-free against the sausage material. However, this additional stage is not desirable in a processing sequence and this has meant that for all practical purposes these casings cannot be used.

Further attempts to solve this problem relate to two-layer sausage casings and exploit the phenomenon of dry shrinkage that occurs if moist hydrophilic films are dried and thereby contract in all dimensions. Thus German patent No. 13 02 384 describes a process for the production of a multi-layer sausage casing that consists of a cellulose fibre layer that, on the inside facing the sausage material, has a coating of polyvinylidenchloride and on the outside is coated with viscose. The coated cellulose layer expands when it becomes moist and then shrinks once again on drying. When this happens the shrinkage stresses that occur can be so great that the sausages will burst if not handled carefully and properly. Compared to the production of a single-layer extruded thermoplastic sausage skin the production of a cellulose fibre casing is extremely complex and costly.

German patent No. 23 58 560 describes the production of a two-layer sausage casing, for table and boiled sausages, having an inner layer, for example, of polyamide 12, and an outer layer of polyamide 6, in which regard the outer layer is subjected to acid treatment. This acid treatment increases the water-absorption or swelling capability of the outer layer and at the same time increases the shrinkage that occurs on drying. The combination of a markedly swellable and thus shrinkable outer layer with an inside layer that is impermeable to water results in dry shrinkage of the outer layer to a casing that lies tightly against its contents. In practice it has been shown, however, that the shrinkage stress of the acid-treated swellable polymer layer, which can be induced by drying, is insufficient. The acid treatment also reduces the mechanical strength of the outer layer.

A variation of the sausage casing according to German patent No. 23 58 560 is described in German patent No. 27 24 252. In place of polyamide 6 that can be rendered swellable by acid treatment a mixture of polyamide 6 with preferably 5 to 20% polyvinyl alcohol is used as the outer layer. These casings are said to have a very low oxygen permeability and fit tightly once the sausage material has cooled; however, they have not yet been adopted for practical use and are not commercially available.

German patent No. 28 50 182 was the first to describe a sausage casing that encloses the sausage material closely and without wrinkling without the need of any additional processing and without any need for recourse to a two-layer structure. This involves a shrinkable multiaxially stretched thermally fixed sausage casing of polyamide, the glass point of which shifts dependent on reversible water absorption down to minus temperatures. Because of this, the casing after boiling and when rinsed off can match the contraction of the sausage material caused by shrinkage and thus remains close fitting.

This casing makes possible a considerable improvement with regard to tightness and freedom from wrinkles; however, the casings require improvement in that they do not display sufficient resistance to tearing in all areas of application. Thus it can sometimes happen that when the full sausage is being cut longitudinally the casing can burst. If one attempts to peel the sausage casing off spirally, in the usual manner, i.e., if one attempts to remove a strip of specific width from a prepared slice in a circumferential direction, it is frequently impossible. More often than not the strip-off direction will continue in the longitudinal direction of the sausage. Finally, the resistance to tearing of the casing plays a large role in the case of vacuum-packed sausages particularly with regard to large-diameter boiled and table sausages. It is preferred that today's boiled and table sausages be packed in half diagonal slices, in order to permit the customer the opportunity to make a visual inspection of the goods. During the vacuum packing of sausage that is sliced diagonally, the air that is always contained in porous coagulated sausage material expands considerably on account of the reduced external pressure thereby straining the casing, particularly in the peripheral direction. A casing that has become marred by a small longitudinal split during the slicing process will thus tear during the vacuum packing in the event of inadequate resistance to tearing, in some cases starting at the location of the damage, parallel to the longitudinal axis, right up to the tip of the sausage.

In addition to the foregoing, it is also desirable that the customer be offered a dull sausage casing since the classical sausage casings of natural intestinal membranes as well as casings of cellulose fibre have exceptionally dull surfaces. For this reason the customer will from time to time assume that only low-quality sausages are packed in shiny artificial casings.

According to German patent No. 28 50 181 an improvement in resistance to tearing is achieved in that instead of the polyamide that is used in German patent No. 28 50 182, the glass point of which can be shifted to low temperatures depending on water absorption, a polymer mixture of these polyamides and modified polyamide-compatible polyolefins, for example, an ionomer resin, is used for the production of the sausage casings. It is obvious that it would be desirable to be able to achieve such an improvemet in resistance to tearing and also achieve a matt surface without using any additives, and thus without using a polymer blend.

Thus it is the task of the present invention, proceeding from the tubular film according to German patent No. 28 50 182, to improve that tubular film to the point that it can be cut without tearing, peeled spirally, vacuum packed when sliced and at the same time has a matt appearance.

This task is solved by a tubular film that consists of a polyamide that can absorb at least 5% of its weight in water up to saturation and displays the following elastic behaviour:

At room temperature, when saturated with water, at an internal pressure between 0 and 0.6 bar according to the equation $\Delta D = m \times p + c$, it will expand cylindrically and evenly according to internal pressurization line (1) and when the internal pressure is released to between 0.6 and 0 bar according to the equation $\Delta D' = -m' \times p + c'$, it will contract cylindrically and according to internal pressure release line (2) wherein $\Delta D$ is the difference in diameter expansion in (mm) during internal pressurization $\Delta D'$ is the difference in diameter contraction in (mm) during internal pressure release m is the upward slope of the internal pressurization line (1) of a plot of $\Delta D$ vs internal pressure m' is the upward slope of the internal pressure release line (2) of a 20 plot of $\Delta D'$ vs internal pressure p is the internal pressure in (bar)

c is the ordinate sector of the internal pressurization line (1)

(c is always=0)

c' is the ordinate sector of the internal pressure release line (2) and the following limiting conditions apply:

1. The absolute values for m and m' lie between 23 and 6, preferably between 20 and 8, and especially between 17 and 11; for a given diameter the values for m and m vary by no more than 20%, preferably by not more than 11%.

2. c' is always less than 4.5 mm, preferably less than 2.5 mm and especially less than 1.5 mm.

3. Equations (1) and (2) apply in the internal pressure range between 0 and 0.6 bar, respectively.

The equations that define the elasticity of the tubular film according to the present invention, together with their limiting conditions, are derived from the following measurements:

Sections of a tubular film according to the invention, 50 cm long, were sealed hermetically at one end and softened for one hour in water at a temperature of approximately 20° C. Subsequently, the open end of the section was connected to a source of compressed air that was fitted with a sensitive pressure gauge and then pressurized from 0 to 0.6 bar in steps of 0.1 bar. For each pressure increment p the difference in diameter $\Delta D$ was measured by means of calipers. Once 0.6 bar had been reached the values for p and $\Delta D$ were measured in the reverse sequence. These measurements were repeated with several sections in order to obtain statistically reliable data.

FIG. 1 shows a graph of typical measurements for a tubular film that is especially preferred according to the invention. It relates to the tubular film produced by the process of Example 1, described later herein.

Figure 2:
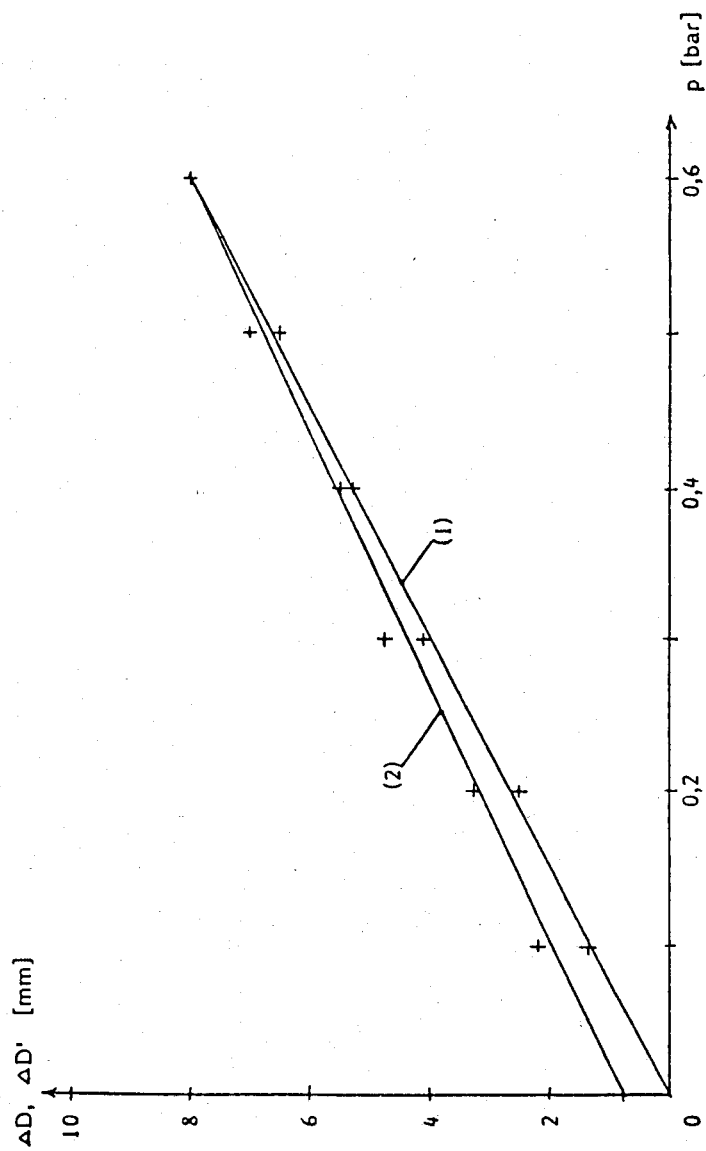

FIG. 2 relates to the tubular film according to the invention, as produced by the process of Example 4, described later herein.

Figure 3:
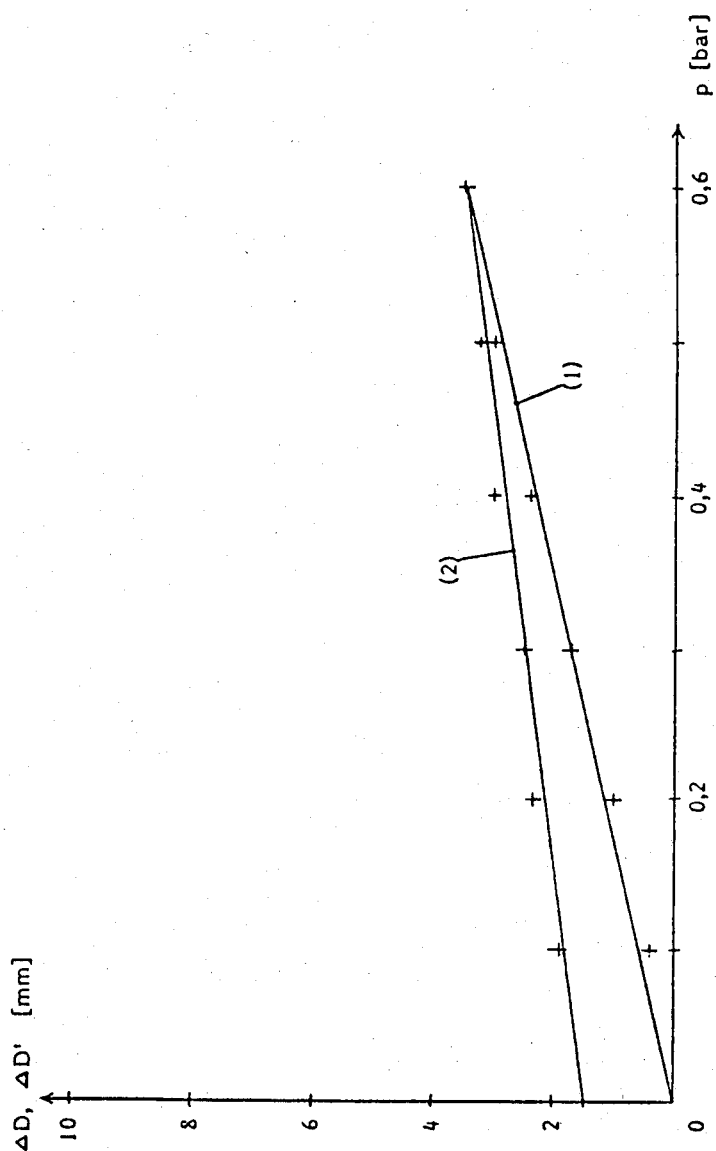

FIG. 3 relates to the tubular film produced by the process of comparative Example 2 described later herein.

In FIG. 1, it is not difficult to see that the internal pressurization line (1) and the internal pressure release line (2) differ very little from each other either in relation to their slopes m and m' or in relation to their ordinate sectors c and c'.

Accordingly, the tubular film according to the invention withstands high internal pressurization of this sort without any significant irreversible stretching in the circumferential direction of the casing. Measurements have revealed that when the casing is being filled internal pressures of between 0.35 and 0.6 bar can occur routinely.

Accordingly, the casing according to the invention can be expanded like a spring and has sufficient recovery so that it will fit closely and without wrinkles after the heat-treated sausage has cooled down.

Thus the recovery corresponds to the diameter expansion difference $\Delta D$ and the spring constant of the slope m of the internal pressurization line (1).

It has been demonstrated that only those tubular films in which the above-cited limiting conditions for m, m', p, c and c' are within the quoted ranges can satisfy the demands for freedom from wrinkles and proper slicing or vacuum packing, respectively.

If m is less than 6, the filling pressure, for example, will be insufficient to ensure sufficient recovery to guarantee freedom from wrinkles. In this case, the "spring" is too stiff. On the other hand, if m is greater than 23 it will no longer be possible to expand the casing cylindrically and regularly during the filling process. Partial bulges will occur. The "spring" is then too soft.

In the event of clear differences between m and m' for the same casing, or for c' values that are greater than 4.5 mm, respectively, the casing is no longer dimensionally stable. It will then become permanently stretched during the filling process, and will no longer be wrinkle-free.

In a preferred version the tubular film is of a polyamide that can crystallize in the $\alpha$form.

Examples of polyamides having a minimum water absorption capability of 5% at room temperature in the water-saturated state are polycaprolactam (PA 6), polyhexamethyleneadipamide(PA 66), and copolymers and mixtures thereof. Of these, polycaprolactam and polyhexamethyleneadipamide are especially preferred. The foregoing polyamides all crystallize in the $\alpha$form.

The preferred wall thickness of the tubular film amounts to 60 to 100 $\mu$m, particularly 65–80 $\mu$m. This has a bursting strength of at least 0.8 bar (at room temperature and at a relative humidity in the range of 35–75%).

The tubular films according to the invention are produced by extrusion of a primary tube of polyamide and subsequent simultaneous multiaxial stretching, characterized in that the primary tube of polyamide, that can absorb up to 5% water, is completely fixed thermally after multiaxial stretching during controlled multiaxial contraction.

The second process stage, multiaxial stretching, is completed by conventional methods, in which, of course, specific minimal stretch conditions in the longitudinal and transverse directions are met or exceeded. The longitudinal stretch ratio is at least 1:2.3 to 1.4, preferably 1:2.7 to 1:2.9, the transverse stretch ratio at least 1:2.5 to 1:4.5, preferably 1:3 to 1:3.5.

The wall thickness of the tubular film that is obtained according to the multiaxial stretch process, should be not less than 30, preferably 35 μm.

In relation to the dimensions of the tubular film after stretching in the longitudinal and the transverse directions, the controlled multiaxial shrinkage in the course of thermal fixing should amount to at least 15%, in which connection shrinkage in the order of 20% can serve as a benchmark. As a rule, shrinkage does not exceed 40%.

Controlled shrinkage and complete thermal fixing can be undertaken in one stage, according to one exemplary version of the process of the invention. In this case, controlled shrinkage and complete thermal fixing are effected in one heat treatment lasting at least 20 seconds. The duration of the heat treatment depends on the reaction temperature, the higher the temperature, the shorter the duration. As a general rule, treatment durations of 240 seconds will suffice. According to one version of the process of the invention the heat treatment can be undertaken using hot water, steam or heated hydrated polyhydric alcohols, preferably glycerin or propylene glycol. If alcohols are used these preferably contain at least 10% water. The temperature of such a heat transfer medium is at least 90 or, at a maximum, 150° C. Alternatively, the heat treatment can be undertaken by means of hot air, a heated inert gas, preferably $CO_2$ or nitrogen, or by means of infrared irradiation, preferably that which is emitted by IR radiators of medium wavelengths, at temperatures of not less than 180° C. Here, too, the duration of the heat treatment will be at least 20 seconds. The upper limit for the duration of the heat treatment and the treatment temperature are critical only so that no damage to the plastic that makes up the film may occur. Accordingly, at higher treatment temperatures the duration of the treatment can be shorter. Treatment temperatures of 320° C. radiator temperature for the IR radiator or an inert gas, respectively, are not to be exceeded. It is preferred that the thermal fixing medium, hot air or protective gas, be blown turbulently against the tubular film. If shrinkage and thermal fixing are undertaken by using IR irradiation, it is preferred that this be done in an oven fitted with IR radiators. According to yet another variation of the process of the invention, controlled shrinkage is permitted after the multiaxial stretching, initially by the application of heat and then thermal fixing is completed in a separate stage while maintaining the dimensions of the tubular film that were obtained after shrinkage. In this regard, it is preferred that higher temperatures are used for the thermal fixing than are used for the shrinkage process.

The same shrinkage conditions apply for this two-stage method of operation as in the one-stage method, i.e., at least 15% shrinkage in the longitudinal and the transverse directions. Controlled shrinkage is efected in the presence of hot water or steam at a temperature of at least 90° C. (the upper limit is preferably 100° C.), whereas thermal fixing is then effected in a separate stage, using hot air, a protective gas, or IR irradiation. The first stage in the two-stage method of operation, i.e., the controlled shrinkage, preferably carried out in the presence of hot water or steam, requires a treatment duration of at least 20 seconds, preferably 30 seconds, at a minimum temperature of 90° C. For the second stage, completion of the thermal fixing, the treatment time will depend, as in the other cases, on the temperature of the medium. The latter should not be below 180° C. As a rule, a treatment time of 3, preferably at least 5 seconds, will be required. Thus, when IR irradiation is used at a temperature of between 180° and 320° C., a treatment time of 3 to 10 seconds will be required.

The tubular film can be either straight or curved in the manner of a circular sausage skin.

As a result of the multiaxial stretching the tubular film according to the invention has a dull surface. This desired effect was obtained quite unexpectedly.

A further surprising effect of the tubular film according to the invention lies in the fact that despite a total lack of shrinkage at under 90° C., it can contain cooked and boiled sausage, cooked between 70° and 87° C. and whose diameter when being filled expands expediently between 5 and 15%, so that it is completely unwrinkled, even after it has cooled down. Up to now, it had been accepted that only shrinkable plastic casings could contain heat-treated sausage without wrinkling after cooling.

The invention will be explained on the basis of the following examples without restriction of the scope thereof.

EXAMPLE 1

Pure commercial polycaprolactam (having a relative viscosity of 4, measured in 1 g granulate, dissolved in 100 ml 96% sulfuric acid at 25° C.) was plasticized in a single cam extruder at 260° C. and extruded through an annular nozzle to fora a primary tube 34 mm in diameter and with walls 0.45 mm thick, and then consolidated by cooling.

Subsequently, the primary tube was warmed to 85° C. and simultaneously stretched multiaxially with the help of a secondary blower. This resulted in the following stretch ratios:

Lateral stretch ratio: 1:3
Longitudinal stretch ratio: 1:3
Wall thickness taper: 9:1

Thus was obtained a multiaxially stretched tubular film of 102 mm diameter having a wall thickness of 0.050 mm, the surface being very shiny and which had high shrinkage.

In the subsequent third stage of the process the film was thermally fixed to be multiaxially stretchable with the help of a tertiary blower whilst permitting lateral shrinkage of 21% and longitudinal shrinkage of 19%, relative to the dimensions of the multiaxial stretched tubular film, by treatment with hot water at 90° C. for 35 seconds. Thus was obtained a tubular film according to the invention, having a diameter of 80-81 mm and having a wall thickness of 0.070 mm.

Finally, the tubular film was dried and whilst retaining its last dimensions it was passed for 5 seconds through an oven fitted with medium wavelength IR radiators and heated to 212° C. and thereby totally thermally fixed. It was then cooled, flattened, and rolled.

The film so obtained could not be shrunk at under 90° C. The outside was now dull and resisted tearing to the extent that it could be made into sausage casing, filled with raw sausage material, boiled and cooled, cut neatly, and effectively vacuum packed in halved form (see Table later herein).

In addition to the foregoing the tubular film contained the cooled cooked sausage without wrinkling when, during the filling process, it was expanded by some 10% to a diameter of 88-89 mm. Its elastic behaviour according to the invention is shown in FIG. 1.

EXAMPLE 2

Whilst maintaining all the conditions set out in Example 1 and using polycaprolactam as the molding material, a multiaxially stretched tubular film was produced that was treated with saturated steam at 100° C. instead of with water in the third stage of the process. The following stages were exactly the same as those in Example 1. The tubular film according to the invention, which was produced by this variation of the process, displayed the same characteristics as the tubular film produced as in Example 1.

EXAMPLE 3

Using the same polycaprolactam as in process stage 3, the same procedure was followed as in Example 1. The controlled shrink thermal fixing was however carried out by using glycerine instead of the treatment involving hot water; the glycerine that was used contains 14-15% water and was heated to 120° C. The time involved was 40 seconds. The same shrink values were permitted as in Example 1. Subsequently, the tubular film was cleansed of glycerin by being sprayed with water, dried, laid flat, and rolled.

The film was already totally thermally fixed, so that it was possible to dispense with treatment in the IR radiator oven. The film produced in this example displayed the same characteristics as the films obtained in Examples 1 and 2.

EXAMPLE 4

Pure commercial polyhexamethyleneadipamide (PA 66) having a relative viscosity of 3.6 (measured in 1 g granulate, dissolved in 100 ml 96% sulfuric acid at 25° C.) was plasticized in a single cam extruder at 280° C. and extruded through an annular nozzle to form a primary tube of 34 mm diameter and with a wall thickness of 0.45 mm, and then consolidated by cooling.

The primary tube was simultaneously multiaxially stretched after being warmed to 95° C. The following stretch ratios were used when this was done:

Transverse stretch ratio: 1:3.2
Longitudinal stretch ratio: 1:2.8
Wall thickness taper: approximately 9:1

This resulted in a highly stretched tubular film of approximately 109 mm diameter and having a wall thickness of 0.050 mm. This film was then treated with a tertiary blower with hot water at 95° C. for 35 seconds, in which regard a longitudinal shrinkage of 19% and a transverse shrinkage of 21% were permitted.

A tubular film was obtained that had a diameter of 86 mm and a wall thickness of 0.070 mm.

Subsequently this was passed on for thermal fixing in the inflated state with retention of its last dimensions and passed for 5 seconds through an IR oven at 235° C., totally thermally fixed thereby and finally cooled, laid flat and rolled.

The polyhexamethyleneadipamide film according to the invention that was produced by this method did not shrink at below 90° C., had an extremely dull outside surface, and was so tear resistant that it could be cut neatly and properly vacuum packed in halved form (see Table later herein).

Furthermore, it contained cooled cooked sausage without wrinkling when it was expanded by approximately 7% to a diameter of 92 mm during the filling process. Its elastic behaviour according to the invention is shown in FIG. 2.

COMPARTIVE EXAMPLE 1

The same polycaprolactam as in Example 1 was extruded and multiaxially stretched under the conditions given for Example 1.

Departing from the process according to the invention, the tubular film was thermally fixed for 8 seconds by inflation with hot air at 160° C. and with retention of its stretch dimensions (thus without any longitudinal and transverse shrinkage and because of this without any increase in wall thickness), cooled down, laid flat, and rolled.

A tubular film was obtained having a diameter of 102 mm and a wall thickness of 0.050 mm. It was immersed in warm water at 78° C. and shrank 16% transversely and 18% longitudinally within 2 seconds. It had a very shiny outer surface, could not be cut so neatly or vacuum packed in halved form in the same way as the casings in Examples 1 to 4 (see Table later herein).

Comparative Example 2:

Polyamide 6.9, that preferably forms crystals in the γ-form and absorbs only 3% water when in the water-saturated state at room temperature, and having a relative viscosity of 3.3 (measured on 1 g granulate in 100 ml 96-% sulfuric acid at 25° C.) was plasticized in a single cam extruder at 225° C. and extruded through an annular nozzle to form a primary tube 34 mm in diameter and having a wall thickness of 0.45 mm; this was then consolidated by cooling.

Subsequently, this primary tube was treated in exactly the same manner as in Example 1 according to the invention, in which connection all the process parameters remain the same as in Example 1.

A polyhexamethylenenonanamide tubular film was obtained that did not shrink below 90° C., had a relatively dull outside surface, and met all requirements with regard to neat slicing and proper vacuum packing but which, as can be seen from FIG. 3, was so stiff that it could not contain cooked sausage without wrinkling (m-value too low).

Furthermore, this casing, while it preferably formed crystals in the γ-form and not in the α-form remained more easily deformed during the boiling process than the casings according to the invention.

The elasticity of this PA 6.9 casing that was too small as a consequence of inadequate water absorption capacity (less than 5%) at room temperature when in the water saturated state.

The following table shows the criteria that are important from the standpoint of the invention, on the basis of the examples.

TABLE

| Examples/Characteristics | Molding Mass | (1) Water Absorption (%) | Crystal Shape | (2) Surface Lustre | (3) First Cutting Certainty (%) | (4) Vacuum Packing Safety | (5) Wrinkle Formation |
| --- | --- | --- | --- | --- | --- | --- | --- |
| Example 1 (according to invention) | PA 6 | 11 | α | 11 | 92 | 196 | No wrinkles |
| Example 4 (according to invention) | PA 6, 6 | 9 | α | 9 | 96 | 196 | No wrinkles |
| Comparative Example 1 | PA 6 | 11 | α | 35 | 47 | 94 | No wrinkles |
| Comparative Example 2 | PA 6, 9 | 3 | γ | 18 | 87 | 180 | Wrinkles |

(1) Water absorption (%) at room temperature by storing in water until saturated.
(2) Surface lustre measurement as per DIN 67530 - angle of incidence 60 degrees; standard light C (artificial daylight), 100 deg. scale.
(3) First cutting certainty (%) established by cutting 100 cooled cooked sausages with a knife sharpened to conventional trade standards. Data are the number of cooked sausages that can be cut without damage to the sausage casing in the longitudinal direction.
(4) Vacuum packing safety: the sausage halves obtained after the cutting test (200 in each instance) were vacuum packed in a commercial 'Autovac* Type AVQ' from Kramer and Grebe W. Germany with the manometer at the stop (100% vacuum). The table quotes the number of sausage halves that underwent the test without longitudinal splitting of the casing as far as the tip.
(5) Assessed visually after the cooked sausage has cooled down (100 in each case). Plain longitudinal wrinkles were formed only in Comparative Example 2.
*Trade Mark The embodiments of the invention in which an exclusive property or privilege is claimed are defined as follows:

1. A single layer tubular film of polyamide used for packing and casing foodstuffs in paste form, especially foodstuffs that are packed when hot or are subject to heat treatment after packing, wherein the tubular film:
   consists of at least one polyamide that can absorb at least 5% of its weight in water up to saturation;
   is completely thermofixed; and
   displays the following elastic behaviour:
   (i) at room temperature, when saturated with water, at an internal pressure between 0 and 0.6 bar, expands cylindrically and evenly according to the equation (1) $\Delta D = m \times p + c$; and
   (ii) when the internal pressure is released to between 0.6 and 0 bar, contracts cylindrically according to the equation (2) $\Delta D' = m' \times p + c'$, wherein:
   $\Delta D$ is the difference in diameter expansion in (mm) during internal pressurization;
   $\Delta D'$ is the difference in diameter contraction in (mm) during internal pressure release;
   $m$ is the upward slope of a plot of $\Delta D$ vs internal pressure;
   $m'$ is the upward slope of a plot of $\Delta D'$ vs. internal pressure;
   $p$ is the internal pressure in (bar);
   $c$ is the ordinate intersection of equation (1), with c equal to zero;
   $c'$ is the ordinate intersection of equation (2);
   $c'$ is always less than 4.5 mm; and
   equations (1) and (2) apply in the internal pressure range between 0 and 0.6 bar, respectively.

2. The tubular film according to claim 1, wherein the film consists of a polyamide that can crystallize in the α-form.

3. The tubular film according to claim 1, wherein the film consists of polycaprolactam, polyhexamethyleneadipamide, mixtures of polycaprolactam and polylmexamethyleneadipamide, and/or copolyamides of caprolactam, hexamethylenediamine and adipic acid.

4. The tubular film according to claim 1, wherein the tubular film is straight or curved in the manner of a circular sausage.

5. The tubular film according to claim 1, wherein the film has a wall thickness of 0.06 to 0.10 mm.

6. The tubular film according to claim 1, wherein the film has a bursting strength of at least 0.8 bar.

7. A tubular film according to claim 1, which after processing into parboiled sausages in accordance with good trading practices, exhibits:
   no wrinkles after throughly cooling;
   a cutting certainty of more than 90% when cutting in halves along an angle of 45° as demonstrated by 100 pieces thusly cut; and
   a vacuum packing certainty of more than 95% as demonstrated by the 100 pieces cut.

8. A tubular film according to claim 1, which exhibits a surface lustre less than 11, when determined as per DIN 67 530.

9. A tubular film according to claim 1, which exhibits a surface lustre less than 6, when determined as per DIN 67 530.

* * * * *